United States Patent [19]

Yonce

[11] 3,836,843

[45] Sept. 17, 1974

[54] ELECTRIC CIRCUIT TESTER CONNECTOR FOR HIGHWAY VEHICLES

[76] Inventor: Everett R. Yonce, 259 E. 12th St., Oakland, Calif. 94606

[22] Filed: Apr. 9, 1973

[21] Appl. No.: 349,261

Related U.S. Application Data

[63] Continuation of Ser. No. 192,445, Oct. 26, 1971, abandoned.

[52] U.S. Cl. ............... 324/51, 339/14 P, 339/113 L
[51] Int. Cl. .......................... G01r 31/02, H01r 3/06
[58] Field of Search .......... 324/51, 54, 53, 66, 72.5, 324/133; 339/14 R, 14 P, 113 L, 151 B, 157 C; 340/252

[56] References Cited
UNITED STATES PATENTS

| | | | |
|---|---|---|---|
| 1,735,295 | 11/1929 | Olley | 339/14 L |
| 2,195,975 | 4/1940 | Ribble et al. | 324/51 X |
| 2,229,927 | 1/1951 | Kamper | 324/51 |
| 2,899,638 | 8/1959 | Olson | 324/53 |
| 3,004,217 | 10/1961 | Ciardiello | 324/53 |
| 3,383,588 | 5/1968 | Stoll et al. | 324/66 X |
| 3,428,888 | 2/1969 | Nolte | 324/51 |

Primary Examiner—Gerard R. Strecker
Attorney, Agent, or Firm—Joseph B. Gardner

[57] ABSTRACT

A test connector is provided for checking electrical circuits between a truck and a towed trailer, or between two sections of a semi-trailer highway vehicle. The test connector includes a cylindrical body enclosing a configuration of small indicator lamp bulbs visible through one end thereof. Electrical prongs may be plugged into a mating electrical connector for coupling each of the lamps into a corresponding electrical circuit to be tested. A hook of electrically conductive material extends from the test connector to provide (1) a means for supporting the connector to a frame member or other part of a vehicle, and (2) an electrical ground connection between the test connector and the vehicle.

4 Claims, 3 Drawing Figures

PATENTED SEP 17 1974

3,836,843

INVENTOR:
EVERETT R. YONCE

BY Joseph B. Gardner
ATTORNEY

ELECTRIC CIRCUIT TESTER CONNECTOR FOR HIGHWAY VEHICLES

This is a continuation, of application Ser. No. 192,445, filed Oct. 26, 1971, now abandoned.

BACKGROUND OF THE INVENTION

This invention relates to electrical circuits extending between a tractor or truck and a towed unit or trailer of a highway semi-trailer or truck-trailer combination; and more particularly this invention provides a test connector which may be used for checking those electrical circuits.

Highway vehicles are required to have "running" lights and "taillights" for showing the presence of the vehicles to drivers of other vehicles which may approach or overtake the vehicles on a roadway during hours of darkness. Vehicles must have further lights for signaling purposes, such that other drivers may know when brakes are being applied and when a left or right turn is intended. These lights operate from electrical circuits which extend from switches in the cab or driver's compartment to various locations on the sides and the rear of the vehicle. When a trailer is towed by another vehicle, the electrical circuits must pass through a flexible electrical cable which spans between the towing vehicle and the trailer. In semi-trailer combination vehicles, an electrical cable must extend between the tractor unit and the trailer unit of the combination vehicle. Electrical plug connectors are provided, such that the cable may be conveniently disconnected when the vehicles are unhitched from each other, or when the tractor unit is separated from the trailer unit of a semi-trailer combination vehicle.

In the interest of highway safety, the various electrical circuits of a truck-trailer combination vehicle must be frequently checked. Obviously, a simple check of the overall circuits would be to plug the connectors together and to test the circuits through the truck-trailer combination as a whole. A driver could operate the brakes, could turn on the various light switches, and could operate the turn signal control lever, while another preson standing behind and apart from the vehicle could observe the various lights. If a malfunctioning of one or more of the circuits is detected, a trouble shooter must determine the cause; and it then becomes important to establish whether the trouble is in the switches or wiring of the truck, or is in the lamps or wiring of the trailer. Under these conditions, it has been found to be most expedient to unplug the connector to electrically separate the truck from the trailer such that the circuits of each unit can be separately checked. Indeed, it is frequently necessary to check the electrical circuits in one unit such as the tractor or truck unit without the presence of another companion unit.

It is an object of this invention to provide an improved means for checking electrical circuits connecting between a truck or tractor unit and a trailer unit of a semi-trailer combination vehicle; and more particularly, it is an object to provide a pluggable test connector which will mate and plug into a connector of the vehicle unit for providing a visual indication of the functioning or malfunctioning of the electrical circuits.

It is a further object to provide an improved test connector for checking electrical circuits of a truck-trailer combination vehicle wherein said connector may be hooked onto and supported by a part of the vehicle; and more specifically, it is an object to provide an electrically conductive hook arrangement for both supporting the test connector, and for electrically grounding the test connector such that electric currents may pass through the indicator lamps which will provide visual indications of the functioning of the electrical circuits.

SUMMARY OF THE INVENTION

According to a preferred embodiment of this invention, the test connector includes a hollow electrically-conductive body with both ends open. Electric prongs in a predetermined configuration are supported by a first transverse dielectric bulkhead and extend toward one of the open ends of the cylindrical body. Indicator lamps in a corresponding configuration are supported by a second transverse bulkhead and are visible through the second open end of the cylindrical body. Spiral springs are clamped to the electrical prongs and are compressed against bottom contacts of the indicator lamps to provide paths for electric currents between the prongs and the corresponding indicator lamps. An electrically conductive hook extends from the cylindrical body to provide both mechanical support for and an electrical ground connection to the test connector. Each of the indicator lamps is grounded through the second transverse bulkhead, the cylindrical body, and the hook support to a vehicle part.

DESCRIPTION OF THE DRAWINGS

The various features and advantages of this invention will become apparent upon a consideration of the following description taken in connection with the accompanying drawings which illustrate an exemplary embodiment of the test connector of this invention. The views of the drawings are as follows.

DESCRIPTION OF THE PREFERRED EMBODIMENT

Figure 1:
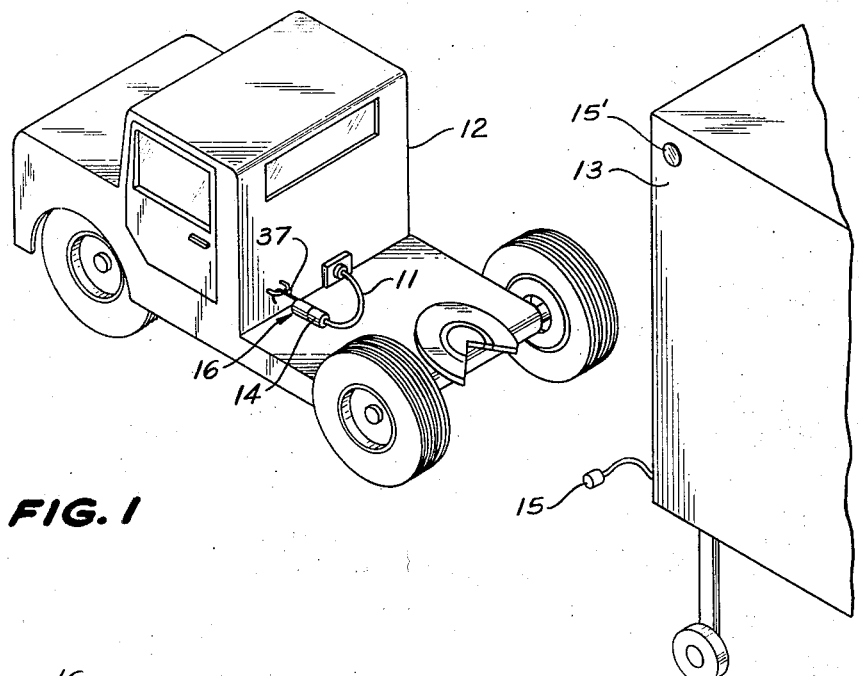
FIG. 1 is a perspective view of a part of a truck-trailer combination vehicle with a test connector in accordance with this invention plugged into an electrical connector and cable from the truck and hooked over a metal part of the truck in a position to provide the truck driver with indications for checking the electrical circuits.

As shown in FIG. 1, the test connector of this invention may be used for testing electrical circuits of a flexible electric cable 11 extending between a truck or tractor unit 12 and a trailer unit 13 of a semi-trailer combination vehicle. The truck 12 and the trailer 13 are shown separated, although it will be understood that the circuits may be tested with the units hitched together as used on a roadway. The flexible cable 11 is attached at one end to the truck unit 12 and is provided with a plug connector 14 that may be plugged into a mating connector 15 on the trailer unit 13 and which is electrically coupled to various running lights 15' and signal lights of the trailer unit 13. An electrical test connector 16 is plugged into the connector 14 of the truck unit 12, and is hooked over a metal part of the truck unit in a position to be visible to a driver or other person who may operate the brakes and the various electric switches in the cab or driver's compartment of the truck unit 12.

Figure 2:
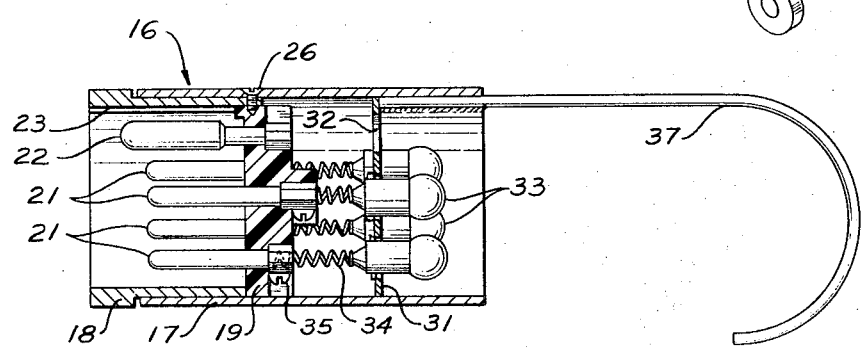
FIG. 2 is a longitudinal sectional view of the test connector of this invention.
Figure 3:
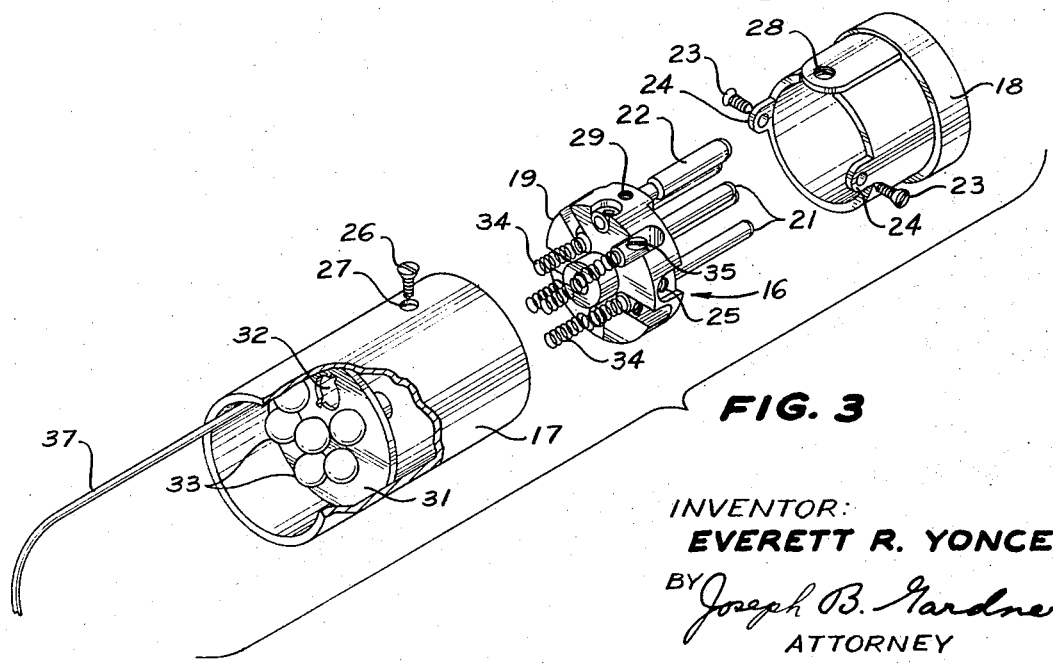
FIG. 3 is an exploded view of the test connector wherein the various parts are shown in perspective.

As shown in FIGS. 2 and 3, the test connector 16 includes a cylindrical sleeve or body 17 having both ends open. An end housing 18 is partially inserted into a first open end of the outer cylindrical body 17. A first bulkhead 19 closes across the housing 18 and provides support for a configuration of electrical prongs 21. The prongs 21 are enclosed and protected by the end housing 18 and are within the cylindrical body 17. The prongs extend toward the first open end of the cylindrical body 17 and the end housing 18. As shown in FIGS. 2 and 3, the prongs may be arranged rather symmetrically in a geometric pattern or configuration, but one of the prongs 22 is somewhat larger than the others such that the test connector 16 may be plugged into the connector 14 in only one possible way to assure that each prong 21 - 22 makes electrical contact with a correct mating part of the connector 14. A slot or channel 23 in the mouth opening of the end housing 18 also assures proper polarization of the connectors when the two are plugged together.

The first bulkhead 19 is formed of a material which is electrically non-conductive such that the various prongs 21 - 22 may be supported and electrically insulated from each other and from other parts of the connector 16. The bulkhead 19 is seated into the end housing 18 and is held therein by means such as machine screws 23 (see FIG. 3) which pass through holes in ears 24 of the housing 18, and are threaded into holes 25 in the bulkhead 19. The cylindrical body 17 slides over both the bulkhead 19 and a shank part of the end housing 18 such that the bulkhead 19 is positioned intermediately between the two open ends of the body 17. The parts are held together by a further machine screw 26 which extends through a hole 27 in the cylindrical body 17, through a mating hole 28 in the end housing 18, and threads into a mating hole 29 in the transverse bulkhead 19.

A second transverse bulkhead 31 is positioned intermediately between the first bulkhead 19 and the second open end of the cylindrical body 17. The second bulkhead 31 may be of metal or other electrically conductive material and may be attached to the cylindrical body 17 by means such as spot welding. A configuration or pattern of holes 32 are punched or drilled or otherwise formed in the bulkhead 31, and indicator lamp bulbs 33 are seated therein. The lamp bulbs 33 have a bayonet type holding means such that each bulb 33 is inserted through a hole 32 and given a partial twist whereby side protrusions catch beneath the sides of the hole 32 and secure the lamp bulb in place. As shown in FIGS. 2 and 3, the indicator lamps 33 are enclosed and protected by the cylindrical body 17, and are visible through the open end thereof.

The prongs 21 are electrically connected to the indicator lamps 33 by means such as small spiral springs 34. Each spring 34 is clamped to a respective one of the prong members 21 by means such as a set screw 35. An end wire of each spiral spring 34 may be straightened and inserted behind the set screw 35 such that the set screw may be tightened and clamped thereon. When the cylindrical body 17 is positioned over the first transverse bulkhead 19, each spring 34 abuts against and is compressed by the bottom contact end of a respective indicator 33. The force of the spring compression will hold the indicator lamp bulb firmly against the second bulkhead 31 by the protrusions on each side thereof. The springs provide a path for electric currents between the prongs 21 held by the first bulkhead 19 and the indicator lamps 33 held by the second bulkhead 31.

A hook extension 37 is attached to the cylindrical body 17 by means such as welding. The hook 37 is of electrically conductive material such as steel, and can provide an electrical path for grounding the test connector 16 to a frame part or other member of the vehicle 12. Therefore, it will be appreciated that the hook 37 performs dual functions of (1) providing a mechanical support for holding the test connector 16 in a position where the indicator lamps 33 may be observed, and (2) providing an electrical grounding of the test connector. A path for electrical current is provided for each indicator lamp 33 from a prong 21, through a respective spiral spring 34, through the indicator lamp, via the second bulkhead 31 and the cylindrical body 17 to the hook 37 and to a ground on the vehicle 12. Obviously, the second bulkhead 31, the cylindrical body 17 and the hook 37 are electrically conductive and provide a common ground connection for all of the indicator lamps 33.

The test connector of this invention enjoys the advantage of permitting a single person such as a truck driver to test the electrical circuits connecting between two separable units of a highway combination vehicle. The test connector may be plugged into the electrical circuits, and by means of the hook 37 the connector is grounded and is held in a position for the driver to visually observe the indicator lamps as he tests the various electrical circuits. No second person is necessary to make observations as to the proper functioning of the circuits.

The test connector of this invention is small and portable, and can have a prong configuration that is standardized with all of the plug connectors of a fleet of trucks and other vehicles. Therefore, a single test connector can be used to check out the electrical circuits for many vehicles. Although FIG. 1 of the drawing illustrates this test connector being used for checking the electrical circuits of a conventional semi-trailer combination vehicle, it will be appreciated that this invention can be applied to any combination of highway vehicles wherein one vehicle tows another and certain electrical circuits must extend between the towing vehicle and the towed vehicle.

As previously indicated, the lights 33 have a predetermined orientation in which the positions of the lights respectively correspond to the positions of the prongs 21 so that one observing the lights will be able to determine which circuits are functioning properly. It will be apparent that legends or other indicia may be included as a part of the test connector, possibly on the bulkhead 31, to supply specific information as to the circuits with which the lights are respectively associated. Ordinarily, the cable 11 is sufficiently long that the test connector 16 can be hung from a door handle so that one seated within the tractor can readily observe the condition of the lights 33. In the specific embodiment being considered, the body 17 is electrically conductive so that the test connector could be placed upon any part of the metal chassis or body of the tractor and the appropriate ground connection therewith established. Further, the large prong 22 is generally a ground connection, and the condition of the ground circuit can be tested by insulating the body 17 and hook 37 from the chassis of the tractor.

This latter feature is of considerable practical importance because it is quite common to find the ground connection to the tractor chassis through the cable 11 to be cut or broken, thereby resulting in the only ground circuit from the trailer 13 to be effected through the fifth-wheel of the tractor. Such connection is generally quite good when the vehicle is stationary at a test station, but it is intermittent when the vehicle is in motion because of the relative displacements between the tractor 12 and trailer 13 that occur at the fifth-wheel connection therebetween as a consequence of road bumps, etc.

The test connector is small, compact, lightweight, handy (it can be carried in a coat or pants pocket), and convenient to use. It permits repair work on the tractor 12 when the trailer 13 is not available. The number of indicator lights 33 and prongs 21 can be increased or decreased as necessary for any particular embodiment of the test connector, and the test lights and prongs may be oriented in a standard or universal configuration so that the device can be used with various tractor-trailer rigs.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A test connector for testing electrical circuits of highway tractor and trailer vehicles, comprising: a body having a hollow interior portion; a first transverse bulkhead extending across said body and being electrically non-conductive; a plurality of contacts mounted in said first transverse bulkhead for making electrical connection with such electrical circuits; a plurality of electric lamps each provided with a pair of terminals and being supported by said body such that illumination of each lamp is visible so as to provide visual indications of voltage being applied to an associated electrical circuit; means respectively coupled between said contacts and one of the terminals of said electric lamps for electrically connecting the same with the respectively associated contacts; an electrically conductive hook; and means electrically connecting said hook to the other terminal of each of said electric lamps; said hook connected with said body having a portion thereof extending from said body for supporting said test connector and for making an electrical ground connection between each of said electric lamps and one of said vehicles, whereby a plurality of complete test connector circuits connecting such electrical circuits of a vehicle to the ground thereof can be provided through said contacts, said means coupled between said contacts and corresponding electric lamps, said electric lamps, said means electrically connecting said hook and electric lamps, and said hook.

2. The test connector of claim 1 in which said body is provided with a second electrically conductive bulkhead defining the aforesaid means electrically connecting said hook to the other terminal of each of said electric lamps, said second bulkhead being electrically connected with said hook and also being electrically connected with said other terminal of each electric lamp.

3. The test connector of claim 2 in which said body is electrically conductive, said hook and said second bulkhead both being secured to said body to provide a path for electric current therethrough, and said second bulkhead having a plurality of openings therein respectively receiving said electric lamps and making electric contact with the aforesaid other terminals thereof.

4. The test connector of claim 1 in which said means respectively coupled between said contacts and one of the terminals of said electric lamps comprises a plurality of springs respectively connected with said contacts and extending to and compressed against the terminal of the associated electric lamp to pass current between the contact and lamp.

* * * * *